(12) United States Patent
Kobayashi et al.

(10) Patent No.: US 6,436,308 B2
(45) Date of Patent: Aug. 20, 2002

(54) MN-ZN FERRITE AND PRODUCTION PROCESS THEREOF

(75) Inventors: Osamu Kobayashi; Osamu Yamada; Kiyoshi Ito, all of Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 8 days.

(21) Appl. No.: 09/769,296

(22) Filed: Jan. 26, 2001

(30) Foreign Application Priority Data

Feb. 8, 2000 (JP) ........................................ 2000-030388

(51) Int. Cl.$^7$ .............................. B22F 1/00; C04B 35/26
(52) U.S. Cl. ..................................................... 252/62.62
(58) Field of Search ....................................... 252/62.62

(56) References Cited

FOREIGN PATENT DOCUMENTS

| | | |
|---|---|---|
| DE | 17 71 921 A | 4/1972 |
| JP | 49-53199 A | 5/1974 |
| JP | 52-4753 | 1/1977 |
| JP | A 7-230909 | 8/1995 |
| JP | A 9-18092 | 1/1997 |
| JP | A 10-208926 | 8/1998 |
| JP | A 11-199235 | 7/1999 |

OTHER PUBLICATIONS

Abstract for JP07–230909, 8/95.*
Babbar et al., "Hot–Pressed Mn–Zn–Ni and Mn–Zi–Co Ferrites for Magnetic Recording Heads," IEEE Transactions on Magnetics, vol. 28, No. 1, 1992, pp. 21–26.

* cited by examiner

*Primary Examiner*—C. Melissa Koslow
(74) *Attorney, Agent, or Firm*—Oliff & Berridge, PLC

(57) ABSTRACT

The present invention provides a Mn—Zn ferrite having an electrical resistivity exceeding 1 Ωm order and having a high initial permeability of 4000 or more at 100 kHz and 100 or more at 10 MHz. The main components of the Mn—Zn ferrite include 44.0 to 49.8 mol % $Fe_2O_3$, 15.0 to 26.5 mol % ZnO, 0.1 to 3.0 mol % CoO, 0.02 to 1.00 mol % $Mn_2O_3$, and the remainder MnO. The Mn—Zn ferrite can be used in a wide frequency region of 100 kHz to 10 MHz by limiting $Fe_2O_3$ content to a range of less than 50 mol %, that is the stoichiometric composition, inhibiting formation of $Mn_2O_3$ and adding a proper amount of CoO.

5 Claims, No Drawings

MN-ZN FERRITE AND PRODUCTION PROCESS THEREOF

BACKGROUND OF THE INVENTION

1. Field of the Invention

The present invention relates to an oxide magnetic material having soft magnetism, and more particularly relates to a Mn—Zn ferrite suitable for use as various inductance elements, impedance elements for EMI countermeasures and the like, and to a production process thereof.

2. Description of the Related Art

Typical oxide magnetic materials having soft magnetism include a Mn—Zn ferrite. Conventionally, this Mn—Zn ferrite usually has a basic component composition containing 52 to 55 mol % $Fe_2O_3$ on the average exceeding 50 mol %, which is the stoichiometric composition, 10 to 24 mol % ZnO and the remainder MnO. The Mn—Zn ferrite is usually produced by mixing respective material powders of $Fe_2O_3$ ZnO and MnO in a prescribed ratio, subjecting mixed powders to respective steps of calcination, milling, component adjustment, granulation and pressing to obtain a desired shape, then conducting sintering treatment at 1200 to 1400° C. for 2 to 4 hours in a reducing atmosphere in which a relative partial pressure of oxygen is controlled to a low level by supplying nitrogen. The reason why the Mn—Zn ferrite is sintered in the reducing atmosphere is that $Fe^{2+}$ is formed as the result of reducing a part of $Fe^{3+}$. This Fe2+ has positive crystal magnetic anisotropy and cancels out negative crystal magnetic anisotropy of $Fe^3$ to thereby enhance soft magnetism.

Amount of the above-mentioned $Fe^{2+}$ formed depends on relative partial pressures of oxygen in sintering and cooling after the sintering. Therefore, when the relative partial pressure of oxygen is improperly set, it becomes difficult to ensure excellent soft magnetic properties. Thus, conventionally, the following expression (1) has been experimentally established and the relative partial pressure of oxygen in sintering and in cooling after the sintering has been controlled strictly in accordance with this expression (1).

$$\log Po_2 = -14540/(T+273)+b \quad (1)$$

where T is temperature (° C.), $Po_2$ is a relative partial pressure of oxygen, and b is a constant, which is usually set at 7 to 8. The fact that the constant b is 7 to 8 means that the relative partial pressure of oxygen in the sintering must be controlled in a narrow range, which makes the sintering treatment very troublesome, thereby increasing production costs.

Additionally, in recent years, with miniaturization and performance improvement of electronic equipments there is an increasing tendency that signals are processed at a higher frequency. Thus, a magnetic material having excellent magnetic properties even in a higher frequency region as well has been needed.

However, when the Mn—Zn ferrite is used as a magnetic core material, an eddy current flows in a higher frequency region applied resulting in a larger loss. Therefore, in order to extend an upper limit of the frequency at which the Mn—Zn ferrite can be used as a magnetic core material, an electrical resistivity thereof must be made as high as possible. However, since the above-mentioned general Mn—Zn ferrite contains $Fe_2O_3$ in an amount larger than 50 mol % which is the stoichiometric composition, a large amount of Fe 2+ ions are present, thereby making the transfer of electrons between the above-mentioned Fe3+ and $Fe^{2+}$ ions easy. Thus, the electrical resistivity of the Mn—Zn ferrite is in the order of 1 Ωm or less. Accordingly, an applicable frequency is limited to about several hundreds kHz at highest, and in a frequency region exceeding the limit, permeability (initial permeability) is significantly lowered to take away properties of the soft magnetic material.

In order to increase an apparent resistance of the Mn—Zn ferrite, in some cases, CaO, $SiO_2$ or the like is added as additive to impart a higher resistance to grain boundaries and at the same time the Mn—Zn ferrite is sintered at as low as about 1200° C. to diminish the grain size from its usual dimension, about 20 $\mu$m, to 5 $\mu$m, which constitutes measures to increase the ratio of the grain boundary. However, even if such measures are adopted, it is difficult to obtain an electrical resistivity exceeding 1 Ωm order as the grain itself has a low resistance, and the above-mentioned measures fall short of a thorough solution.

Further, a Mn—Zn ferrite to which, for example, CaO, $SiO_2$, $SnO_2$ and $TiO_2$ are added to obtain a higher resistance has been developed and is disclosed in Japanese Patent Application No. Hei 9-18092. However, the electrical resistivity of the Mn—Zn ferrite is as low as 0.3 to 2.0 Ωm, which is insufficient for application in a high frequency region. Further, a Mn—Zn ferrite containing 50 mol % or less $Fe_2O_3$ to which $SnO_2$ or the like is added is disclosed in EPC 1,304,237. Although it is supposedly very difficult for $Fe^{2+}$ to be formed when $Fe_2O_3$ content is 50 mol % or less, the Mn—Zn ferrite described in this EPC patent contains as much as 3 to 7 mol % $Fe^{2+}$. Therefore, the electrical resistivity of the Mn—Zn ferrite in the EPC patent cannot exceed the electrical resistivity of a conventional general Mn—Zn ferrite.

On the other hand, a Mn—Zn based ferrite which contains less than 50 mol % $Fe_2O_3$ for a higher resistance has been developed for use as a core material for a deflecting yoke and is disclosed in Japanese Patent Laid-Open Nos. Hei 7-230909, Hei 10-208926, Hei 11-199235 and the like.

However, judging from the fact that the application thereof is a core material for a deflecting yoke and from examples of the invention described in each publication, the Mn—Zn based ferrites described in any of the above publications are ferrite materials intended to be applied in a frequency region of 64 to 100 kHz. It is described that reason for setting the $Fe_2O_3$ content to 50 mol % or less for obtaining a high resistance is to make it possible to wind a copper wire directly around a core for a deflecting yoke. Thus, those publications do not suggest the application of the Mn—Zn based ferrite in such a high frequency region as exceeding 1 MHz. All the Mn—Zn based ferrites have an initial permeability of about 1100 at 100 kHz, and excellent soft magnetic properties cannot be obtained by merely setting the $Fe_2O_3$ content to less than 50 mol % so as to obtain a high electrical resistivity.

Further, Japanese Patent Examined Application No. Sho 52-4753 discloses a Mn—Zn ferrite containing 50 mol % or less $Fe_2O_3$, to which 1.3 to 1.5 mol % CoO was added in order to decrease the temperature coefficient of initial permeability. This Mn—Zn ferrite also contains as low as 11 mol % ZnO and its relative partial pressure of oxygen at sintering and cooling is not strictly controlled. Thus, the initial permeability at 100 kHz is about 2000.

SUMMARY OF THE INVENTION

The present invention has been made in consideration of the above-mentioned conventional problems, and an object of the present invention is therefore to provide a Mn—Zn ferrite which has a higher electrical resistivity than 1 Ωm order and at the same time high initial permeabilities of 4000 or more at 100 kHz and of 100 or more at 10 MHz, and a production process by which such a Mn—Zn ferrite can be obtained easily and inexpensively.

A Mn—Zn ferrite according to an aspect of the present invention to attain the above-mentioned object is characterized in that the main components include 44.0 to 49.8 mol % $Fe_2O_3$, 15.0 to 26.5 mol % ZnO, 0.1 to 3.0 mol % CoO, 0.02 to 1.00 mol % $Mn_2O_3$ and the remainder MnO.

The present Mn—Zn ferrite may contain, in addition to the above-mentioned main components, at least one of 0.010 to 0.200 mass % $V_2O_5$, 0.005 to 0.100 mass % $Bi_2O_3$, 0.005 to 0.100 mass % $In_2O_3$, 0.005 to 0.100 mass % PbO, 0.001 to 0.100 mass % $MoO_3$ and 0.001 to 0.100 mass % $WO_3$ as additive.

Further, the present Mn—Zn ferrite has an initial permeability of 4000 or more at 100 kHz and 100 or more at 10 MHz at room temperature (25° C.).

Still further, a production process according to the present invention to attain the above-mentioned object is characterized in that a mixed powder whose components are adjusted so as to obtain the composition of the above-mentioned Mn—Zn ferrite is pressed, then sintered and cooled, after the sintering, down to 500° C. or lower in an oxygen atmosphere with a relative partial pressure of oxygen defined by an arbitrary value selected from a range of 6 to 10 as a constant b in the expression (1).

DETAILED DESCRIPTION OF THE PREFERRED EMBODIMENTS

In a conventional general Mn—Zn ferrite, $Fe_2O_3$ content is more than 50 mol % that is the stoichiometric composition, as described above. Thus, in order to prevent this excessive $Fe_2O_3$ from getting precipitated as hematite, sintering and cooling had to be performed under a condition where a relative partial pressure of oxygen is reduced to a significantly lower level by flowing nitrogen, that is a condition obtained with the constant b set to 7 to 8. On the other hand, since the Mn—Zn ferrite of the present invention contains less than 50 mol % $Fe_2O_3$, hematite is hardly precipitated. Thus, even if a range of relative partial pressure of oxygen in sintering is somewhat increased, excellent magnetic properties can be obtained. Further, in a conventional Mn—Zn ferrite that contains more than 50 mol % $Fe_2O_3$, about 3.0 mol % $Fe^{2+}$ exists. On the other hand, in the Mn—Zn ferrite of the present invention, Fe 2+ content is as little as 0.1 to 0.7 mol %. Accordingly, the electrical resistivity of the Mn—Zn ferrite of the present invention is very high. Therefore, an eddy current is not increased so much even in a high frequency region, and an excellent initial permeability can be obtained. However, if this $Fe_2O_3$ content is too small, the saturation magnetization is deteriorated. Thus, at least 44.0mol % $Fe_2O_3$ is needed.

ZnO as main component influences the Curie temperature and the saturation magnetization. Too small amount of ZnO reduces the initial permeability, but on the contrary, too large amount of ZnO lowers the saturation magnetization and the Curie temperature, so ZnO content is set to the above-mentioned range of 15.0 to 26.5 mol %.

Since $Co^{2+}$ in CoO has a positive crystal magnetic anisotropy, CoO can cancel out a negative crystal magnetic anisotropy of $Fe^{3+}$ even if $Fe^{2+}$ having a positive crystal magnetic anisotropy exists only in a small amount. Further, $Co^{2+}$ has an effect of reducing the loss in a high frequency region by generating an induction magnetic anisotropy. However, when CoO content is too small, the effect is small. On the contrary, when the CoO content is too large, the magnetic strain becomes large and the initial permeability is decreased. Thus, the CoO content is set to 0.1 to 3.0 mol %.

A manganese component in the above-mentioned ferrite exists as $Mn^{2+}$ and $Mn^{3+}$. However, since $Mn^{3+}$ strains a crystal lattice, thereby significantly lowering the initial permeability, $Mn_2O_3$ content is set to 1.00 mol % or less. However, if the $Mn_2O_3$ content is too small, the electrical resistivity is significantly decreased. Thus, at least 0.02 mol % $Mn_2O_3$ is to be contained in the ferrite.

In the present invention, at least one of $V_2O_5$, $Bi_2O_3$, $In_2O_3$, PbO, $MoO_3$ and $WO_3$ can be contained as additive(s). All of these additives have an action of accelerating grain growth. The initial permeability in a comparatively lower frequency region depends on its grain size, so the initial permeability in a lower frequency region can be enhanced by allowing the above-mentioned additive(s) to be contained. However, if the content thereof is too small, the effects are small. On the contrary, if the content is too large, grains grow abnormally. Accordingly, it is desirable that $V_2O_5$ be set to 0.01 to 0.200 mass %, $Bi_2O_3$, $In_2O_3$ and PbO be respectively set to 0.005 to 0.100 mass %, and $MoO_3$ and $WO_3$ be respectively set to 0.001 to 0.100 mass %.

In the present invention, as described above, amount of Mn3+ is controlled by conducting sintering and cooling after the sintering in an atmosphere of a relative partial pressure of oxygen obtained by using an arbitrary value in a range of 6 to 10 as a constant b in the expression (1). When a value larger than 10 is selected as the constant b, the amount of $Mn^{3+}$ in the ferrite becomes larger than 1 mol % whereby the initial permeability is rapidly lowered. Therefore, the amount of $Mn^{3+}$ in the ferrite must be decreased to increase the initial permeability. Thus, it is desirable that a small value be selected as the constant b. However, when a value smaller than 6 is selected, amount of Fe 2+ is increased or amount of $Mn^{3+}$ is decreased too much whereby the electrical resistivity is significantly lowered. Accordingly, the constant b is set to at least 6.

In production of the Mn—Zn ferrite, respective raw material powders of $Fe_2O_3$, ZnO, CoO, $Mn_2O_3$ and MnO, which are the main components, are previously weighed for a prescribed ratio, and mixed to obtain a mixed powder, and then this mixed powder is calcined and finely milled.

Although temperatures for the calcination may be set slightly different from each other depending on target compositions, appropriate temperatures are selected from a range of 800 to 1000° C. Further, a general-purpose ball mill can be used for the fine milling of the calcined powder. When $V_2O_5$, $Bi_2O_3$, $In_2O_3$, PbO, $MoO_3$ and $WO_3$ are made to be contained as additives, proper amounts of powders of these additive are added to the fine milled powder and mixed with each other to obtain a mixture having a target composition. Then, in accordance with a usual ferrite production process, granulation and pressing are conducted, and sintering is then conducted at 1100 to 1400° C. Incidentally, in the granulation a process of adding a binder such as polyvinyl alcohol, polyacrylamide, methyl cellulose, polyethylene oxide or glycerin can be used, and in the pressing a process of applying pressure of, for example, 80 MPa or more can be used.

In the above-mentioned sintering and cooling after the sintering, a relative partial pressure of oxygen is controlled by flowing inert gas such as nitrogen gas or the like into a sintering furnace. In this case, as the constant b in the expression (1), an arbitrary value can be selected from a range of 6 to 10. Thus, the constant b has a very wide allowance as compared to the constant b (7 to 8) selected in a case where a conventional general Mn—Zn ferrite containing more than 50 mol % $Fe_2O_3$ is sintered, and the relative partial pressure of oxygen can be easily controlled. Further, in this case, the cooling after the sintering needs to be performed in accordance with the above-mentioned expression (1) only until the temperature gets down to 500° C. because the reaction of oxidation or reduction at a temperature lower than 500° C. can be ignored irrespective of the relative partial pressure of oxygen.

EXAMPLES

Example 1

Respective raw material powders of $Fe_2O_3$ CoO, MnO, $Mn_2O_3$ and ZnO were weighed for a composition of 42.0 to 51.0 mol % $Fe_2O_3$, 0 to 4 mol % CoO, and the remainder including MnO, $Mn_2O_3$ and ZnO with a molar ratio of MnO to ZnO being 3:2 when both MnO and $Mn_2O_3$ are all counted as MnO, and mixed with a ball mill. Then, the mixed powder was calcined in the air at 900° C. for 2 hours and milled with the ball mill for 20 hours, and a fine milled powder was obtained. Then, this fine milled powder was adjusted with regard to the component so as to obtain the composition above mentioned and further mixed with the ball mill for 1 hour. Then, this mixture was granulated with addition of polyvinyl alcohol and pressed at a pressure of 80 MPa into toroidal cores (green compacts) each having an outer diameter of 18 mm, an inner diameter of 10 mm and a height of 4 mm. Then, the green compacts were placed in a sintering furnace where an atmosphere was adjusted by flowing nitrogen so as to have such a relative partial pressure of oxygen as obtained by setting the constant b in the expression (1) to 8, sintered at 1300° C. for 3 hours and cooled after the sintering, and samples 1-1 to 1-9 as shown in Table 1 were obtained.

Final component compositions of the respective samples 1-1 to 1-9 thus obtained were checked by a fluorescent X ray analysis, and their electrical resistivities and initial permeabilities at 100 kHz and 10 MHz were measured. The results are shown together in Table 1.

TABLE 1

| Sample | | Main Component (mol %) | | | | Electrical Resistivity | Initial Permeability | |
|---|---|---|---|---|---|---|---|---|
| No. | Classification | $Fe_2O_3$ | MnO* | ZnO | CoO | ($\Omega$m) | 100 kHz | 10 MHz |
| 1-1 | Comparison | 51.0 | 29.3 | 19.6 | 0.1 | 0.2 | 3190 | 1 |
| 1-2 | Comparison | 50.2 | 29.8 | 19.9 | 0.1 | 0.5 | 3660 | 1 |
| 1-3 | Present Invention | 49.8 | 30.1 | 20.0 | 0.1 | 80 | 4080 | 110 |
| 1-4 | Present Invention | 49.0 | 30.3 | 20.2 | 0.5 | 110 | 4260 | 140 |
| 1-5 | Comparison | 47.0 | 31.8 | 21.2 | 0 | 170 | 1980 | 50 |
| 1-6 | Present Invention | 47.0 | 31.2 | 20.8 | 1.0 | 140 | 4400 | 180 |
| 1-7 | Comparison | 47.0 | 29.4 | 19.6 | 4.0 | 150 | 2760 | 80 |
| 1-8 | Present Invention | 44.0 | 31.8 | 21.2 | 3.0 | 230 | 4030 | 170 |
| 1-9 | Comparison | 42.0 | 33.6 | 22.4 | 2.0 | 270 | 2380 | 90 |

*Mn is counted as MnO

As apparent from the results shown in Table 1, all the samples 1-3 to 1-9 each containing less than 50 mol % $Fe_2O_3$ have significantly higher electrical resistivities than the comparative samples 1-1 and 1-2 each containing more than 50 mol % $Fe_2O_3$. Further, out of these samples, the samples 1-3, 1-4, 1-6 and 1-8 of the present invention containing 44.0 to 49.8 mol % $Fe_2O_3$ and 0.1 to 3.0 mol % CoO obtained the initial permeabilities of 4000 or more at 100 kHz and 100 or more at 10 MHz as well.

Example 2

Respective raw material powders of $Fe_2O_3$, CoO, ZnO, MnO and $Mn_2O_3$ were weighed for a composition of 48.0 mol % $Fe_2O_3$, 1.0 mol % CoO, 12.0 to 27.0 mol % ZnO, and the remainder including MnO and $Mn_2O_3$, and mixed with a ball mill, and samples 2-1 to 2-6 shown in Table 2 were obtained by following the same production conditions as employed in Example 1. Final component compositions of the respective samples 2-1 to 2-6 thus obtained were checked by a fluorescent X ray analysis, and their initial permeabilities at 100 kHz and 10 MHz and Curie temperatures were measured. The results are shown together in Table 2.

TABLE 2

| Sample | | Main Component (mol %) | | | | Initial Permeability | | Curie Temperature |
|---|---|---|---|---|---|---|---|---|
| No. | Classification | $Fe_2O_3$ | MnO* | ZnO | CoO | 100 kHz | 10 MHz | (° C.) |
| 2-1 | Comparison | 48.0 | 39.0 | 12.0 | 1.0 | 2960 | 190 | 190 |
| 2-2 | Present Invention | 48.0 | 36.0 | 15.0 | 1.0 | 4010 | 180 | 180 |
| 2-3 | Present Invention | 48.0 | 33.0 | 18.0 | 1.0 | 4330 | 170 | 150 |
| 2-4 | Present Invention | 48.0 | 30.0 | 21.0 | 1.0 | 4600 | 160 | 130 |
| 2-5 | Present Invention | 48.0 | 27.0 | 24.0 | 1.0 | 4430 | 140 | 100 |
| 2-6 | Comparison | 48.0 | 24.0 | 27.0 | 1.0 | 4220 | 130 | 70 |

*Mn is counted as MnO

As can be seen from the results shown in Table 2, the initial permeabilities of 4000 or more at 100 kHz and 100 or more at 10 MHz as well are obtained on the samples 2-2 to 2-6 containing 15.0 mol % or more ZnO. However, the comparative sample 2-6 containing 27.0 mol % ZnO has a low Curie temperature of 70° C., which causes a problem in practical use.

Example 3

Respective raw material powders were weighed for the same composition as in the sample 1-6 of Example 1 and mixed with a ball mill. Then, the mixed powder was calcined in the air at 900° C. for 2 hours and was further milled with the ball mill for 2 hours to thereby obtain a fine milled powder. Then, this fine milled powder was adjusted with regard to the component so as to obtain the composition specified in the above and further mixed with the ball mill for 1 hour. Then, this mixture was granulated with addition of polyvinyl alcohol and pressed at a pressure of 80 MPa into toroidal cores (green compacts) each having an outer diameter of 18 mm, an inner diameter of 10 mm and a height of 4 mm. Then, the green compacts were placed in a sintering furnace where an atmosphere was adjusted by flowing nitrogen so as to have such a relative partial pressure of oxygen as obtained by setting variously the constant b in the expression (1) to a range of 5.5 to 12, sintered at 1300° C. for 3 hours and cooled after the sintering, and samples 3-1 to 3-5 as shown in Table 3 were obtained.

The electrical resistivities and initial permeabilities at 100 kHz and 10 MHz of the samples 3-1 to 3-5 thus obtained were measured. Further, quantitative analysis of $Mn_2O_3$ in the respective samples was performed. The results are shown together in Table 3.

sintered in atmospheres of relative partial pressures of oxygen obtained by setting the constant b in the expression (1) to 6 to 10 have high initial permeabilities at 100 kHz and at 10 MHz. However, since the comparative sample 3-1 which was sintered in an atmosphere of a relative partial pressure of oxygen obtained by setting the constant b to 5.5 has the lowest electrical resistivity, it has the lowest initial permeability at 10 MHz. On the contrary, since the comparative sample 3-5 which was sintered by setting the constant b to 12 contains as much as 1.1 mol % $Mn_2O_3$, it has the lowest initial permeability at 100 kHz.

Example 4

Respective raw material powders were weighed for the same composition as in the sample 1-6 of Example 1 and mixed with a ball mill. Then, the mixed powder was calcined in the air at 900° C. for 2 hours and milled with the ball mill for 20 hours to thereby obtain a fine milled powder. Then, this fine milled powder was adjusted with regard to the component so as to obtain the composition specified in the above, and a given amount of $V_2O_5$, $Bi_2O_3$, $In_2O_3$, PbO, $MnO_3$ or $WO_3$ was added to the fine milled powder as additive, then obtained mixture was further mixed with the ball mill for 1 hour. Then, this mixture was granulated with addition of polyvinyl alcohol and pressed at a pressure of 80 MPa into toroidal cores (green compacts) each having an outer diameter of 18 mm, an inner diameter of 10 mm and a height of 4 mm. Then, the green compacts were placed in a sintering furnace where an atmosphere was adjusted by flowing nitrogen so as to have such a relative partial pressure of oxygen as obtained by setting the constant b in the expression (1) to 8, sintered at 1300° C. for 3 hours and cooled after the sintering, and samples 4-1 to 4-8 as shown in Table 4 were obtained. And average grain size and initial permeability at 100 kHz of the samples 4-1 to 4-8 thus

TABLE 3

| Sample | | b | Electrical Resistivity | Initial Permeability | | $Mn_2O_3$ |
|---|---|---|---|---|---|---|
| No. | Classification | Constant | (Ωm) | 100 kHz | 10 MHz | (mol %) |
| 3-1 | Comparison | 5.5 | 9 | 4620 | 70 | 0.01 |
| 3-2 | Present Invention | 6 | 70 | 4700 | 120 | 0.24 |
| 3-3 | Present Invention | 8 | 140 | 4440 | 180 | 0.43 |
| 3-4 | Present Invention | 10 | 250 | 4150 | 180 | 0.81 |
| 3-5 | Comparison | 12 | 300 | 2810 | 190 | 1.20 |

As can be seen from the results shown in Table 3, all of the samples 3-2 to 3-4 of the present invention which were obtained were measured. The results are shown together in Table 4.

TABLE 4

| Sample No. | Classification | Additive | (mass %) | Grain Size (μm) | Initial Permeability 100 kHz |
|---|---|---|---|---|---|
| 1-6 | Present Invention | — | | 14 | 4400 |
| 4-1 | Present Invention | $V_2O_5$ | 0.010 | 16 | 4490 |
| 4-2 | Present Invention | $V_2O_5$ | 0.200 | 21 | 4630 |
| 4-3 | Comparison | $V_2O_5$ | 0.300 | Abnormal Grain | 2790 |
| 4-4 | Present Invention | $Bi_2O_3$ | 0.050 | 20 | 4620 |
| 4-5 | Present Invention | $In_2O_3$ | 0.050 | 19 | 4570 |
| 4-6 | Present Invention | PbO | 0.050 | 17 | 4580 |
| 4-7 | Present Invention | $MoO_3$ | 0.050 | 21 | 4700 |
| 4-8 | Present Invention | $WO_3$ | 0.050 | 16 | 4510 |

As can be seen from the results shown in Table 4, all of the samples 4-1, 4-2 and 4-4 to 4-8 of the present invention each containing a proper amount of additive have larger grain sizes and have initial permeabilities further improved, as compared with the sample 1-6 of the present invention containing no additive. However, the comparative sample 4-3 excessively containing $V_2O_5$ as additive incurs an abnormal grain growth, which significantly lowers the initial permeability.

As described above, the Mn—Zn ferrite of the present invention, which contains $Fe_2O_3$ in an amount of 44.0 to 49.8 mol %, that is less than the stoichiometric composition, also contains 0.1 to 3.0 mol % CoO and 0.02 to 1.00 mol % $Mn_2O_3$, and is sintered in an atmosphere of a suitable relative partial pressure of oxygen, obtains excellent initial permeabilities in a wide range of 100 kHz to 10 MHz. Thus, the utility of the Mn—Zn ferrite of the present invention is very large.

Further, when at least one of $V_2O_5$, $Bi_2O_3$, $In_2O_3$, PbO, $MoO_3$ and $WO_3$ is contained in proper amounts as additive, a still higher permeability can be ensured in a low frequency region and the utility is further increased.

Further, according to the production process of the Mn—Zn ferrite of the present invention, the relative partial pressure of oxygen during sintering and after sintering needs not be strictly controlled, thus largely contributing to stabilization and cost reduction in Mn—Zn ferrite production.

What is claimed is:

1. A Mn—Zn ferrite, characterized in that main components include 44.0 to 49.8 mol % $Fe_2O_3$, 15.0 to 26.5 mol % ZnO, 0.1 to 3.0 mol % CoO, 0.02 to 1.00 mol % $Mn_2O_3$ and a remainder MnO.

2. The Mn—Zn ferrite according to claim 1, wherein at least one of 0.010 to 0.200 mass % $V_2O_5$, 0.005 to 0.100 mass % $Bi_2O_3$, 0.005 to 0.100 mass % $In_2O_3$, 0.005 to 0.100 mass % PbO, 0.001 to 0.100 mass % $MoO_3$ and 0.001 to 0.100 mass % $WO_3$ is contained as additive.

3. The Mn—Zn ferrite according to claim 1, wherein an initial permeability at room temperature (25° C.) is 4000 or more at 100 kHz and 100 or more at 10 MHz.

4. A production process of Mn—Zn ferrite, characterized in that a mixed powder whose components are adjusted so as to obtain the composition of the Mn—Zn ferrite according to any one of claims 1 to 3 is pressed, then sintered and cooled, after the sintering, down to 500° C. or lower in an atmosphere of a relative partial pressure of oxygen defined by the following expression:

$$\log P_{O_2} = -14540/(T+273)+b$$

where T is temperature (° C.), $PO_2$ is a relative partial pressure of oxygen, and b is a constant selected from a range of 6 to 10.

5. The Mn—Zn ferrite according to claim 2, wherein an initial permeability at room temperature (25° C.) is 4000 or more at 100 kHz and 100 or more at 10 MHz.

* * * * *